Nov. 24, 1936. R. A. ARENS 2,062,245
FISHING TACKLE ACCESSORY
Filed Jan. 13, 1936
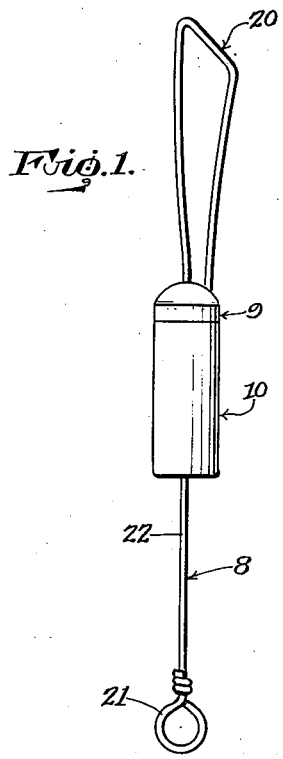
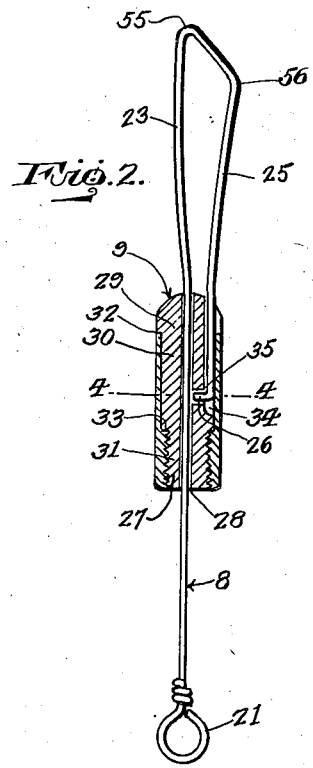
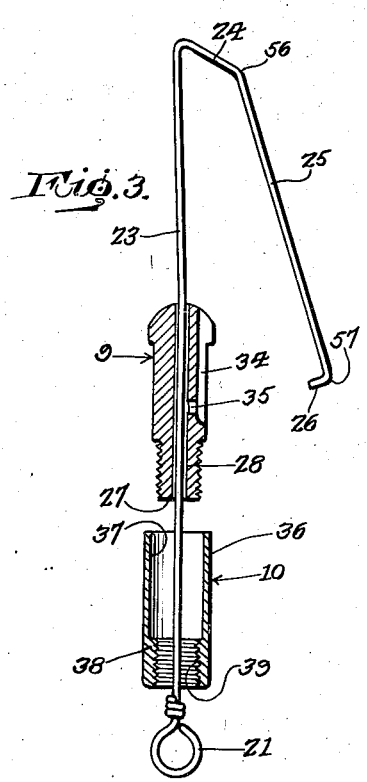
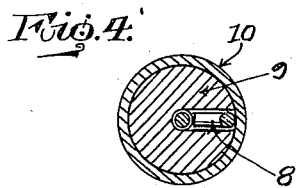
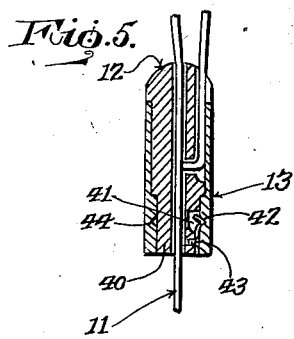
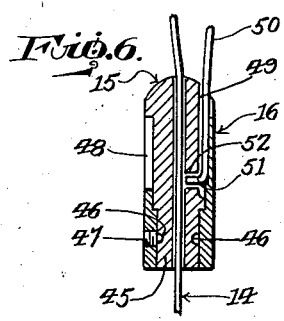
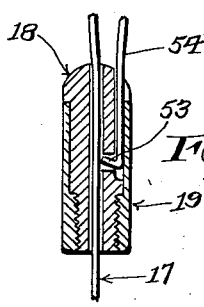
Inventor
Robert A. Arens
By Geo. P. Kimmel
Attorney Patented Nov. 24, 1936

2,062,245

UNITED STATES PATENT OFFICE 2,062,245

FISHING TACKLE ACCESSORY

Robert A. Arens, Chicago, Ill.

Application January 13, 1936, Serial No. 58,948

6 Claims. (Cl. 24—238)

This invention relates to a fishing tackle accessory, more particularly to a coupling device for connecting tackle, such as, for example, hooks, lures, etc., with the fishing line.

Coupling devices now generally employed for connecting tackle with the line depend for their holding power upon a spring which, in the largest sizes of such devices, is very difficult to operate, especially when the fisherman's hands are wet. It is one of the aims of this invention to provide, in a manner as hereinafter set forth, a coupling device capable of being easily operated to overcome the foregoing objection.

Further objects of the invention are to provide, in a manner as hereinafter set forth, a coupling device for the purpose referred to which is simple in its construction and arrangement, strong, durable, compact, capable of engaging with the tackle more positively than the form of coupling devices now generally employed, thoroughly efficient in its use, conveniently and expeditiously operated to and from coupling position, and inexpensive to manufacture.

With the foregoing and other objects in view, the invention consists of the novel construction, combination and arrangement of parts as will be more specifically referred to and as are illustrated in the accompanying drawing, wherein are shown embodiments of the invention, but it is to be understood that changes, variations and modifications may be resorted to which fall within the scope of the invention as claimed.

In the drawing:

Figure 1 is a side elevation of the coupling device in coupling position,

Figure 2 is a vertical sectional view of the device in coupling position,

Figure 3 is a vertical sectional view of the device in non-coupling position,

Figure 4 is a section on line 4—4, Figure 2, and

Figures 5, 6, and 7 are vertical sectional views of modified forms.

A coupling device for the purpose set forth and in accordance with this invention consists of a holder element, a keeper element, and a latching element. With reference to Figures 1, 2, 3, and 4, the holder element, keeper element and latching element are generally indicated, respectively, at 8, 9, and 10. With reference to Figure 5, the holder element, keeper element, and latching element are generally indicated, respectively, at 11, 12, and 13. With reference to Figure 6, the holder element, keeper element, and latching element are generally indicated, respectively, at 14, 15, 16. With reference to Figure 7, the holder element, keeper element, and latching element are generally indicated, respectively, at 17, 18, and 19.

The holder element 8 is formed from a length of spring wire 20 of the desired gauge. The follower end terminal portion of the wire 20 is bent upon itself in a manner to provide a closed eye or loop 21 to which the line, not shown, is attached. The wire 20 includes a straight stretch 22 leading forwardly from the eye 21 and constituting the shank of the element 8. The element 8 includes an elongated split loop having resilient side and forward walls. The stretch 22 merges at its forward end into a slightly inclined stretch 23 constituting the major portion of one of the side walls of the elongated split loop. The stretch 22 at its forward end merges into a stretch 24 which is disposed at an acute angle with respect to the stretch 23. The stretch 24 constitutes the forward end wall of the elongated split loop and merges into a rearwardly directed stretch 25 disposed obliquely to the stretch 24. The stretch 25 forms the other side wall of the elongated split loop. The stretch 25 at its rear end merges into a stretch 26 disposed at right angles to the stretch 25 and which constitutes the rear end wall of the elongated split loop and is formed with a free outer terminus. That side wall of the elongated split loop having its major portion provided by the stretch 23 is completed by a part of the stretch 22. The stretch 23 is of less length than the stretch 25. The stretch 24 is of less length than the stretches 23, 25. The stretch 26 is of less length than the stretch 24. The stretches 23, 24 and 25 are resilient. The stretch 26 is adapted to oppose in close proximity the stretch 22 to provide for substantially closing the loop when the coupling device is in coupling position with respect to the tackle. When the element 8 is in position for connection with the tackle, the stretches 23, 25 are slightly bowed.

The keeper element 9 consists of a body part 27 of any suitable material formed axially thereof with a bore 28 extending from its follower to its leading end. The body part 27 is of cylindrical cross-section and has a rounded leading end. The body part 27 includes a leading portion 29, an intermediate portion 30 and a follower portion 31. The portion 29 is of greater diameter than the portion 30 and at the junction of the two diameters a peripheral shoulder 32 is provided. The portion 30 is of greater diameter than the portion 31 and at the junction of the portion 31 with the portion 30 a peripheral shoulder 33 is provided. The portion 31 is peripherally threaded. The body part 27 is formed with a lengthwise disposed groove 34 in its outer periphery and which extends from the outer end of part 29 to a point in proximity to the rear end of part 30. The latter is formed with an opening 35 disposed diametrically with respect to body part 27 and which communicates at one end with the bore 28 and at its outer end with the groove 34 forwardly of and in proximity to the rear end of groove 34. The latter is open at its leading end and closed at its rear end.

The stretch 22 of the element 8 is arranged in the bore 28 of body part 27. The stretches 23 and 24 are arranged forwardly of the element 9. The rear portion of the stretch 25 tightly engages the wall of the groove 34 when the holder element 8 is in position for connection to the tackle. The stretch 26 is arranged in the opening 35 when the element 8 is in position for connection to the tackle. When the coupling device is in coupling position, it will appear as shown in Figures 1 and 2 and is maintained in such position by the latching element 10. When the coupling device is in coupling position, such as shown in Figures 1 and 2, the stretch 23 is bowed, that portion of the stretch 25 extended from the leading end of the element 9 is also bowed, and the rear portion of stretch 25 is straight and disposed in parallelism with respect to the stretch 22. The latching element 10 functions to secure a portion of the stretch 25 in the groove 34 and the stretch 26 in the opening 35. The wall of the latter constitutes a stop to prevent the stretches 25 and 26 from being pulled free of the element 9.

The element 10 consists of a sleeve 36 formed of two parts of different inner diameters. That part of greatest inner diameter is indicated at 37 and the part of smallest inner diameter at 38. The part 37 is of greater length than the part 38. The latter is arranged at the follower end of the element 10. The inner face of the part 38 is provided with threads 39. When the latching element 10 is in latching position, it is mounted in encompassing relation with respect to the element 9. The leading end of the sleeve 36 abuts the shoulder 32. The leading end of the portion 38 abuts the shoulder 33. The portion 38 threadedly engages with the peripheral threads on the portion 31 of the body part 27. By this arrangement the sleeve 36 bears against the rear portion of the stretch 25 and maintains the stretch 26 in the opening 35.

With reference to the modified form shown in Figure 5, the holder element 11 will be of the same construction as the holder element 8. The keeper element 12 will correspond in structure to the keeper element 9, with the exception that it is not provided at its follower part with peripheral threads, but that its follower part, indicated at 40, has a peripheral recess 41 into which extends a snapping spring 42 anchored to the part 40, as at 43. Otherwise than that as stated, the keeper element 12 will be of the same construction as the keeper element 9. The latching element 13 will be of the same construction as the latching element 10, with this exception, that it is not provided with interior threads, but it is formed with an interiorly arranged annular groove 44 to receive the spring 42, whereby the latching element 13 will be detachably secured to the keeper element 12. Otherwise than that as stated with respect to the latching element 13, it will be of the same construction as the latching element 10.

With reference to the modification shown in Figure 6, the holder element 14 will be of the same construction as the holder element 8. The keeper element 15 will be of the same construction as the keeper element 9, with the exception that the element 15 is not provided with peripheral threads on its follower part 45, but the latter is formed with an annular peripheral groove 46. The latching element 16 is permanently revolubly connected to the element 15 in encompassing relation thereto. The element 16 will be constructed similarly to the element 10, with this exception, that the element 16 is not provided with internal threads, but carries in proximity to its rear end an inwardly extending protuberance 47 which rides in the groove 46 whereby elements 15 and 16 are permanently connected together. A further structural difference between the elements 16 and 10 is that the element 16 is formed in one side with a lengthwise extending slot 48 which opens at its leading edge. The slot 48 is adapted to register with the lengthwise groove 49 in the periphery of the element 15 to enable the positioning of the rear portion of the stretch 50 in the groove 49 and the stretch 51 of the element 14 into the opening 52 in the element 15. After the rear portion of the stretch 50 and the stretch 51 have been arranged in groove 49 and opening 52, the element 16 is revolved in a direction to move the slot 48 out of registry with the groove 49 whereby the element 14 is latched to the element 15 to hold the tackle.

In the modified form shown in Figure 7, the keeper element 18 and latching element 19 correspond in structure to the elements 9 and 10. The holder element 17 is of the same form as the holder element 8, with this exception, that the stretch 53 of element 17, which corresponds to stretch 26 of element 8, is not disposed at right angles to the stretch 54, which corresponds to stretch 25, but it is disposed at an acute angle relative to the rear end of the stretch 54. Otherwise than that as stated, the construction shown in Figure 7 will be the same as that shown in Figures 1 to 4.

When the coupling device is in latched position, the stretches 25, 50, and 54 press outwardly against the latching element and which acts to hold the latching element against rotation to prevent unlocking. It is also obvious that any pulling stress between the bends 55, 56 will be carried chiefly by the stretch 22. The pulling stress that is carried by the element 8 between the bends 56, 57 will be transmitted to the hook which is provided by the stretch 26 or 53. The hook 26 is held firmly in the opening 35 or 52, which is at a right angle to the direction of pull. It is thus provided with solid support which enables the hook 26 to carry a very heavy load because it cannot be withdrawn from opening 35 or opening 52 without being drawn through a right angle bond. Since both ends of the loop are capable of bearing tension stresses, the wire from which the holding element is made may be much lighter and easy to flex than is the wire required for use in the coupling devices now generally employed.

What I claim is:

1. A coupling device comprising a holder element having its leading end portion in the form of a split loop, a keeper element mounted on said holder element and provided with lengthwise and diametrically extending means for receiving respectively a portion of one of the side walls of the loop and the rear end wall of the loop for closing the latter, and a latching element encompassing said keeper element for latching the said portion and rear end wall to the keeper element.

2. A coupling device comprising a holder element having its leading end portion in the form of a split loop, a keeper element mounted on said holder element and provided with lengthwise and diametrically extending means for receiving respectively a portion of one of the side walls of the loop and the rear end wall of the loop for closing the latter, and a latching element encompassing said keeper element for latching the said portion and rear end wall to the keeper element, the walls of said loop being resilient.

3. A coupling device comprising a holder element having its leading end portion in the form of a split loop, a keeper element mounted on said holder element and provided with lengthwise and diametrically extending means for receiving respectively a portion of one of the side walls of the loop and the rear end wall of the loop for closing the latter, and a latching element encompassing said keeper element, for latching the said portion and rear end wall to the keeper element, the said rear end wall of said loop extending inwardly from and disposed at an angle with respect to said portion.

4. A coupling device comprising a holder element having its leading end portion in the form of a split loop, a keeper element mounted on said holder element and provided with lengthwise and diametrically extending means for receiving respectively a portion of one of the side walls of the loop and the rear end wall of the loop for closing the latter, and a latching element encompassing said keeper element for latching the said portion and rear end wall to the keeper element, said loop including a leading end wall inclined relatively to said keeper element.

5. In a coupling device for the purpose set forth, a keeper element formed with an axial bore, a lengthwise extending groove in its periphery opening at its leading end and having its follower end closed and positioned adjacent the follower end of said element, said element including a diametrically disposed opening communicating with the bore and said groove, a holder element extending through said bore and being formed with means to provide a split loop, said means having parts thereof for positioning in said groove and opening, and a latching element encompassing said keeper element and acting to maintain said parts in said groove and opening thereby closing the loop, the said means forming said loop extending from the leading end of said keeper element.

6. In a coupling device for the purpose set forth, a keeper element formed with an axial bore, a lengthwise extending groove in its periphery opening at its leading end and having its follower end closed and positioned adjacent the follower end of said element, said element including a diametrically disposed opening communicating with the bore and said groove, a holder element extending through said bore and being formed with means to provide a split loop, said means having parts thereof for positioning in said groove and opening, and a latching element encompassing said keeper element and acting to maintain said parts in said groove and opening thereby closing the loop, the said means forming said loop extending from the leading end of said keeper element, the said parts positioned in said groove and opening being disposed at an angle relative to each other, that part positioned in said opening being arranged at the follower end of that part positioned in said groove.

ROBERT A. ARENS.